United States Patent
Fukuda et al.

(10) Patent No.: US 6,828,360 B2
(45) Date of Patent: Dec. 7, 2004

(54) THIXOTROPIC FLUORINATED CURABLE COMPOSITIONS AND ARTICLES SEALED THEREWITH

(75) Inventors: Kenichi Fukuda, Gunma-ken (JP); Mikio Shiono, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/322,454

(22) Filed: Dec. 19, 2002

(65) Prior Publication Data

US 2003/0158295 A1 Aug. 21, 2003

(30) Foreign Application Priority Data

Dec. 21, 2001 (JP) ........................................ 2001-389406

(51) Int. Cl.⁷ .......................... C08K 9/06; C08L 83/06; C08L 83/10
(52) U.S. Cl. ....................... 523/212; 524/492; 524/493; 524/588; 525/474; 525/477; 525/478; 525/479
(58) Field of Search ................................. 524/492, 493, 524/588; 523/212; 525/474, 477, 478, 479

(56) References Cited

U.S. PATENT DOCUMENTS

| | | | |
|---|---|---|---|
| 4,771,119 A | 9/1988 | Wrobel | |
| 6,040,400 A | 3/2000 | Fukuda et al. | |
| 6,414,062 B1 * | 7/2002 | Fukuda et al. | 524/267 |
| 6,468,463 B1 * | 10/2002 | Osawa | 264/328.1 |
| 6,528,562 B2 * | 3/2003 | Matsuda et al. | 524/236 |
| 6,552,152 B2 * | 4/2003 | Sakano et al. | 528/42 |
| 6,673,876 B2 * | 1/2004 | Fukuda et al. | 525/478 |
| 2002/0156198 A1 * | 10/2002 | Fukuda et al. | 525/326.2 |

FOREIGN PATENT DOCUMENTS

| | | |
|---|---|---|
| EP | 1 033 387 A2 | 9/2000 |
| EP | 1 033 387 A3 | 9/2000 |
| EP | 1 114 846 A3 | 7/2001 |
| EP | 1 114 846 A2 | 7/2001 |
| EP | 1 170 320 A1 | 1/2002 |
| JP | 56-143241 A | 11/1981 |
| JP | 62-3959 A | 1/1987 |
| JP | 63-35655 A | 2/1988 |
| JP | 7-324165 A | 12/1995 |
| JP | 11-116685 A | 4/1999 |

OTHER PUBLICATIONS

Sato et al. (Machine Translation of JP 2002–327110 obtained from JPO web–site) Nov. 2002.*
Shinichi Sato, Patent Abstracts of Japan, 2002327110, Dec. 11, 2002.

* cited by examiner

*Primary Examiner*—Jeffrey B. Robertson
(74) *Attorney, Agent, or Firm*—Birch, Stewart, Kolasch & Birch LLP

(57) ABSTRACT

In fluorinated curable compositions comprising alkenyl group-bearing perfluoropolyethers as the base polymer to ensure chemical resistance and solvent resistance together with an organohydrogensiloxane and a platinum group metal catalyst, a hydrophobized silica fine powder is used in combination therewith to render the compositions thixotropic.

10 Claims, No Drawings

THIXOTROPIC FLUORINATED CURABLE COMPOSITIONS AND ARTICLES SEALED THEREWITH

This invention relates to fluorinated curable compositions of the addition curing type having high thixotropy, curing into gel products having improved chemical resistance and solvent resistance, and thus suitable for use as potting, sealing and coating materials for electric and electronic parts, and a variety of articles sealed with the cured compositions.

BACKGROUND OF THE INVENTION

Cured gel products of silicone rubber have good electrically and thermally insulating properties, stable electric properties and flexibility. They are useful as potting and sealing materials for electric and electronic parts, and coating materials for protecting control circuit devices such as power transistors, ICs and capacitors from external, thermal and mechanical damages.

Typical silicone compositions capable of forming such cured gel products are organopolysiloxane compositions of the addition curing type. The organopolysiloxane compositions of the addition curing type are known, for example, from JP-A 56-143241, 62-3959, 63-35655 and 63-33475 as comprising an organopolysiloxane having vinyl groups attached to silicon atoms and an organohydrogenpolysiloxane having hydrogen atoms attached to silicon atoms, wherein crosslinking reaction takes place in the presence of a platinum group catalyst to form a silicone gel.

Also known in the art are fluorosilicone gel compositions comprising an organopolysiloxane having trifluoropropyl groups (see JP-A 7-324165).

However, these organopolysiloxane compositions of the addition curing type result in silicone gels which are prone to degradation or swelling upon exposure to such chemicals as strong bases and strong acids or such solvents as toluene, alcohols and gasoline, often failing to maintain their performance.

As one solution to this problem, JP-A 11-116685 discloses a fluorochemical gel composition comprising a polyfluoro compound having two alkenyl groups and a divalent perfluoropolyether group in a molecule, an organohydrogenpolysiloxane having hydrogen atoms attached to silicon atoms, and a platinum group catalyst as well as a fluorochemical gel product resulting from curing thereof.

When gel products are used for protection purpose, gel compositions having a gel-forming ability must be applied onto surfaces of electronic parts by spot potting. However, prior art gel compositions are not amenable to spot potting on account of fast flow, failing to form an effective protective layer on electronic parts. Therefore, there is a need for a gel composition which is reasonably flowable and resistant to chemicals and solvents.

The fluidity of gel compositions can be reduced by increasing their viscosity. However, the compositions lower their viscosity upon heating for curing, yet failing to form an effective protective layer on electronic parts.

SUMMARY OF THE INVENTION

Therefore, an object of the invention is to provide a fluorinated curable composition which can form a flexible cured gel product and is so thixotropic that it is amenable to potting due to a low apparent viscosity when shear stresses are applied during potting operation by means of a dispenser or the like, but it does not substantially flow due to a high apparent viscosity when no shear stresses are applied. Another object of the invention is to provide an article, such as an electric or electronic part, sealed with the cured product of the composition.

The invention provides a thixotropic fluorinated curable composition comprising (A) a linear polyfluoro compound of the general formula (1):

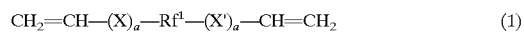
$$CH_2=CH—(X)_a—Rf^1—(X')_a—CH=CH_2 \quad (1)$$

wherein X is $—CH_2—$, $—CH_2O—$, $—CH_2OCH_2—$ or $—Y—NR^1—CO—$, Y is $—CH_2—$ or a group of the following structural formula (Z):

X' is $—CH_2—$, $—OCH_2—$, $—CH_2OCH_2—$ or $—CO—NR^1—Y'—$, Y' is $—CH_2—$ or a group of the following structural formula (Z'):

$R^1$ is hydrogen, methyl, phenyl or allyl, $Rf^1$ is a divalent perfluoropolyether group, and "a" is independently 0 or 1, (B) an organohydrogensiloxane having at least two hydrogen atoms each attached to a silicon atom in a molecule, (C) an effective amount of a platinum group metal catalyst, (D) finely divided silica hydrophobized with a polysiloxane and having a specific surface area of at least 50 $m^2/g$, and optionally, (E) a second linear polyfluoro compound of the following general formula (2):

$$Rf^2—(X)_a—CH=CH_2 \quad (2)$$

wherein X and "a" are as defined above, and $Rf^2$ is a monovalent perfluoropolyether group.

Also contemplated herein are an electric or electronic part, pressure sensor, rotation sensor and air flow meter which is sealed with the thixotropic fluorinated curable composition in the cured state.

It has been found that the above and other objects are effectively achieved by combining components (A) through (D) or components (A) through (E), and especially by compounding silica (D) in an amount of 0.5 to 8 parts by weight per 100 parts by weight of component (A) or components (A) and (E) combined, because the resulting composition is satisfactorily thixotropic and capable of forming a flexible cured gel product.

DESCRIPTION OF THE PREFERRED EMBODIMENT

In the fluorinated curable composition of the invention, component (A) is a linear polyfluoro compound of the following general formula (1).

  (1)

Herein X is —$CH_2$—, —$CH_2O$—, —$CH_2OCH_2$— or —Y—$NR^1$—CO— wherein Y is —$CH_2$— or a group of the following structural formula (Z):

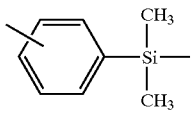  (Z), and $R^1$ is hydrogen, methyl, phenyl or allyl.

X' is —$CH_2$—, —$OCH_2$—, —$CH_2OCH_2$— or —CO—$NR^1$—Y'— wherein Y' is —$CH_2$— or a group of the following structural formula (Z'):

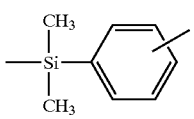  (Z'), and $R^1$ is as defined above.

$Rf^1$ is a divalent perfluoropolyether group, and "a" is independently equal to 0 or 1.

In formula (1), $Rf^1$ is a divalent perfluoropolyether group, and preferably selected from groups of the following formulae:

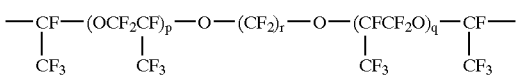

wherein p and q each are an integer of at least 1, the sum of p+q is from 2 to 200, and r is an integer of 2 to 6,

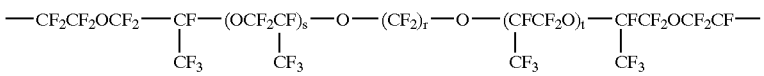

wherein r is an integer of 2 to 6, s is an integer inclusive of 0, t is an integer inclusive of 0, and the sum of s+t is from 0 to 200, and

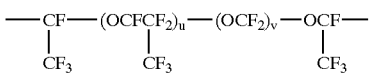

wherein u is an integer of 1 to 200 and v is an integer of 1 to 50.

Illustrative examples of $Rf^1$ are given below.

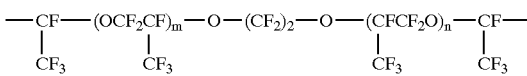
m = 1 to 200, n = 1 to 200, m + n = 2 to 200

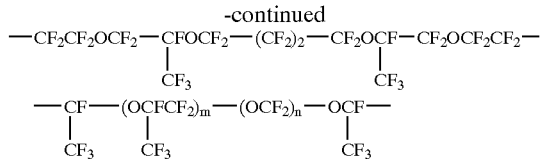
m = 2 to 100, n = 1 to 50

In formula (1), X is independently —$CH_2$—, —$CH_2O$—, —$CH_2OCH_2$— or —Y—$NR^1$—CO—, and X' is —$CH_2$—, —$OCH_2$—, —$CH_2OCH_2$— or —CO—$NR^1$—Y'—. Herein Y is —$CH_2$— or a group of the formula (Z), and Y' is —$CH_2$— or a group of the formula (Z').

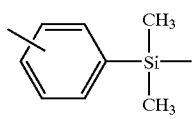  (Z)

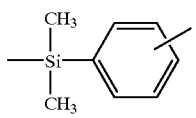  (Z')

R' is hydrogen, methyl, phenyl or allyl.

The alkenyl groups in formula (1) are preferably vinyl and allyl groups having a —CH=$CH_2$ structure at the end. The alkenyl groups may be bonded to opposite ends of the backbone directly or via divalent linkage groups represented by X or X'.

In formula (1), letter "a" is independently equal to 0 or 1.

It is preferred that the inventive composition have an appropriate flow so that the composition is useful in casting, potting, coating, impregnation and adhesion, and that its cured product have appropriate physical properties. From this standpoint, component (A) should preferably have a viscosity at 23° C. in the range of 5 to 100,000 mPa·s, especially 500 to 50,000 mPa·s. Depending on a particular application, component (A) having a most appropriate viscosity within the range is desirably used.

Component (B) is an organohydrogensiloxane having at least two hydrogen atoms each attached to a silicon atom in a molecule.

The organohydrogensiloxane (B) serves as a crosslinker and chain extender for component (A) and optional component (E), and should have at least two hydrosilyl groups (i.e., Si—H groups) in a molecule. For compatibility and dispersion with components (A) and (E) and cured uniformity, component (B) should preferably have at least one fluorinated group.

Suitable fluorinated groups include monovalent perfluorooxyalkyl groups, monovalent perfluoroalkyl groups, divalent perfluorooxyalkylene groups and divalent perfluoroalkylene groups. These perfluorooxyalkyl, perfluoroalkyl, perfluorooxyalkylene and perfluoroalkylene groups are preferably those of the following general formulae.

Monovalent Perfluoroalkyl Groups

m is an integer of 1 to 20, preferably 2 to 10.

Divalent Perfluoroalkylene Groups $$-C_mF_{2m}-$$

m is an integer of 1 to 20, preferably 2 to 10.

Monovalent Perfluorooxyalkyl Groups

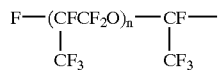

n is an integer of 1 to 5.

Divalent Perfluorooxyalkylene Groups

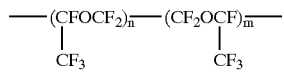

An average of m+n is an integer of 2 to 100.

The following compounds are exemplary of the fluorinated organohydrogensiloxane. These compounds may be used alone or in admixture of two or more. In the formulae, Me is methyl and Ph is phenyl.

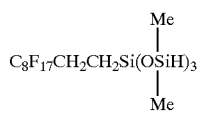

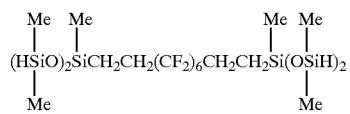

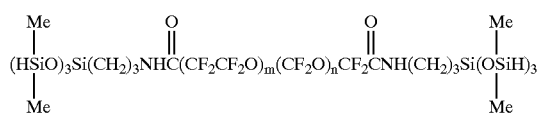

m = 10, n = 6

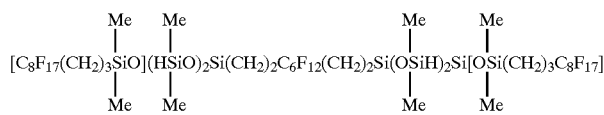

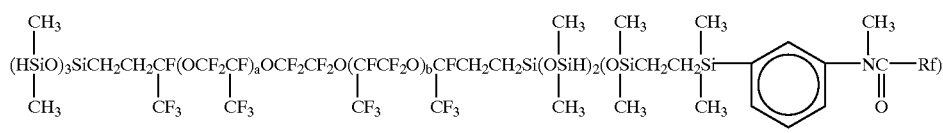

a + b = 5, Rf: F—(CFCF$_2$O)$_{\overline{n}}$—CF—  n = 24
                        |           |
                        CF$_3$      CF$_3$

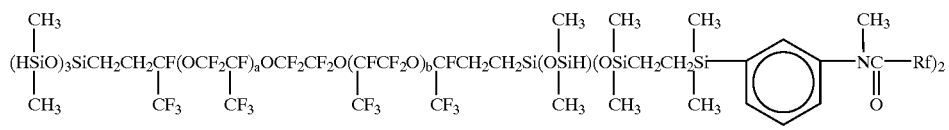

a + b = 4, Rf: F—(CFCF$_2$O)$_{\overline{n}}$—CF—  n = 50
                        |           |
                        CF$_3$      CF$_3$

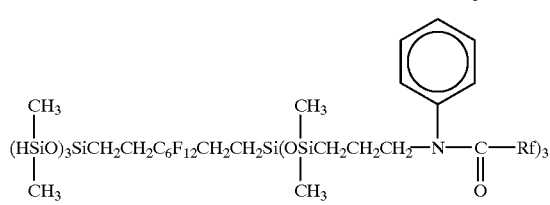

Rf: F—(CFCF$_2$O)$_{\overline{n}}$—CF—  n = 30
          |           |
          CF$_3$      CF$_3$

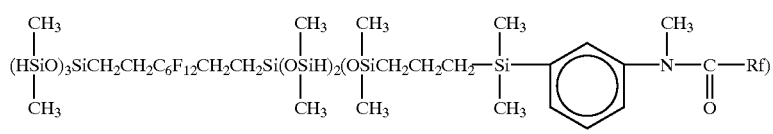

Rf: F—(CFCF$_2$O)$_{\overline{n}}$—CF—  n = 24
          |           |
          CF$_3$      CF$_3$ -continued
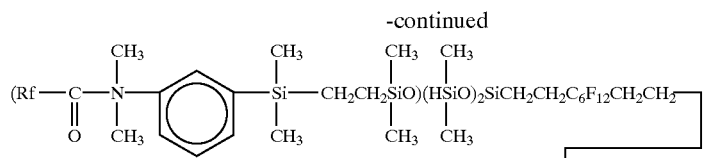
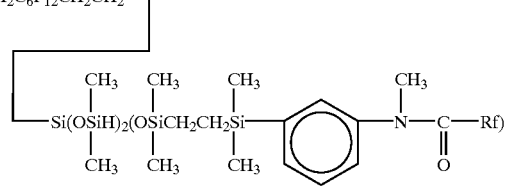
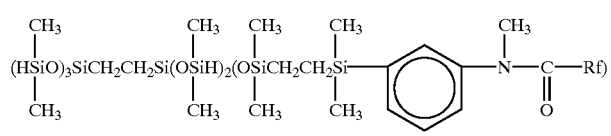
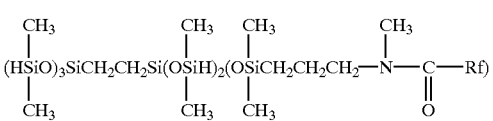
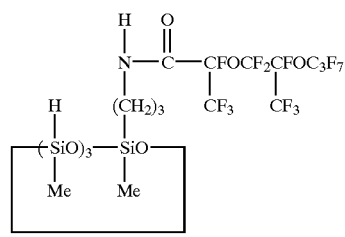
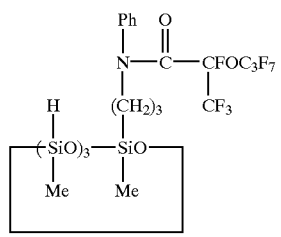
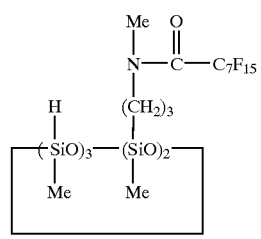
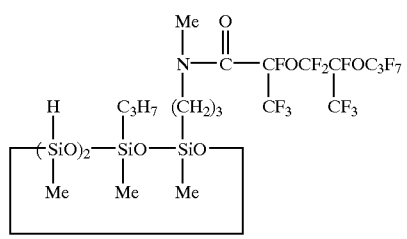
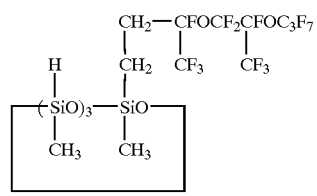
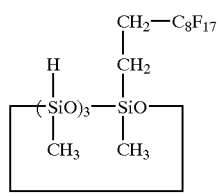
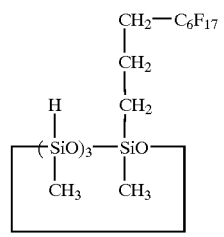
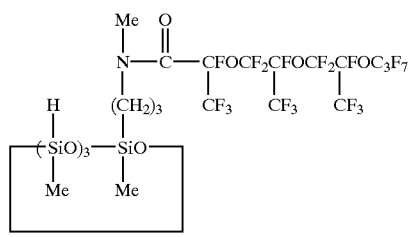

-continued
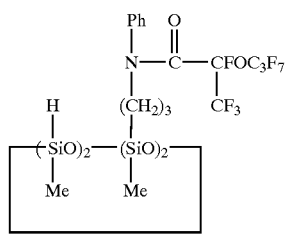
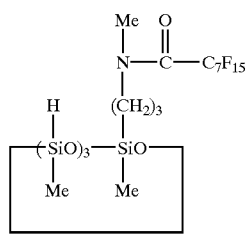
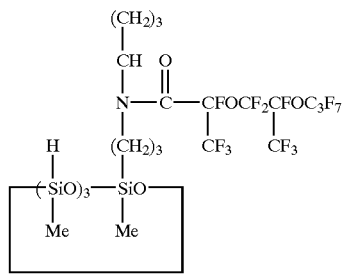
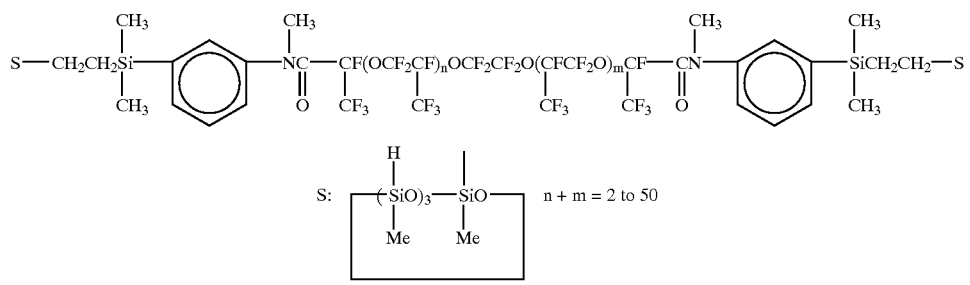
n + m = 2 to 50
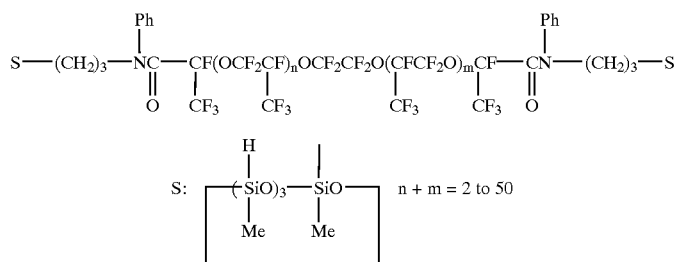
n + m = 2 to 50
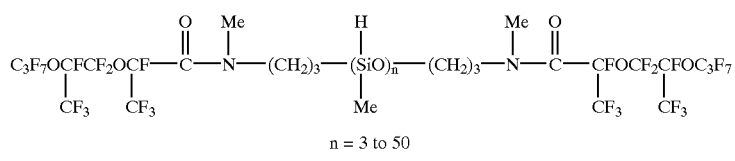
n = 3 to 50

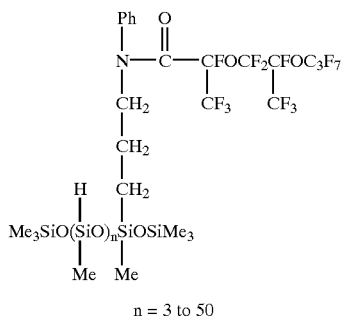
n = 3 to 50
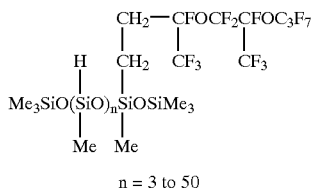
n = 3 to 50
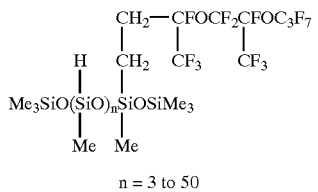
n = 3 to 50
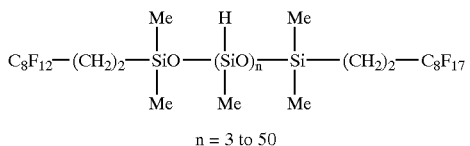
n = 3 to 50
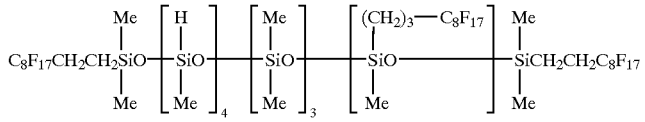
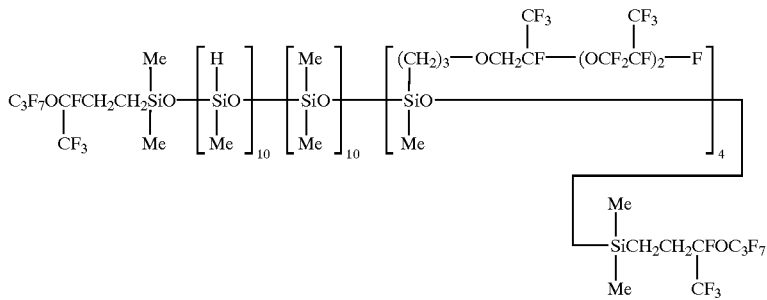
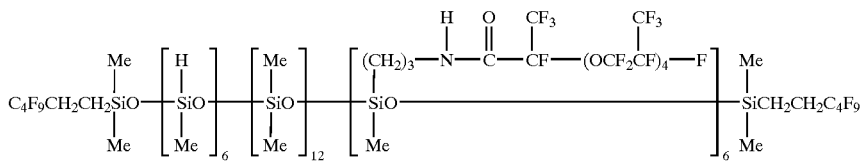
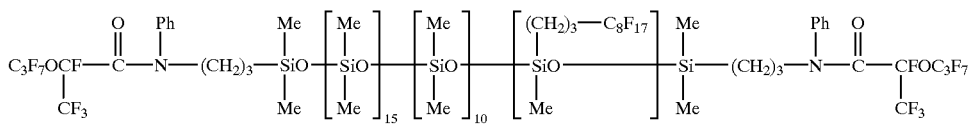
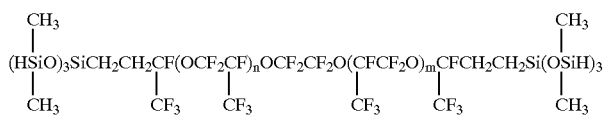

Each of n and m is an integer of at least 1, and n+m is from 2 to 50.

Component (B) is included in such amounts that 0.2 to 2 moles, more preferably 0.5 to 1.3 moles of hydrosilyl groups (i.e., Si—H groups) are available from component (B) per mole of aliphatic unsaturated groups (e.g., vinyl and allyl groups) in the entire composition. Amounts of component (B) to provide less than 0.2 mole of Si—H groups may fail to drive crosslinking to a sufficient degree to form a cured gel product. Amounts of component (B) to provide more than 2 moles of Si—H groups may invite a risk of foaming upon curing.

Component (C) is a platinum group metal catalyst for promoting addition reaction between aliphatic unsaturated groups in components (A) and (E) and hydrosilyl groups in component (B). These catalysts are generally noble metal compounds which are expensive, and therefore, platinum compounds which are relatively easily available are often employed.

The platinum compounds include, for example, chloroplatinic acid, complexes of chloroplatinic acid with olefins such as ethylene, complexes of chloroplatinic acid with alcohols and vinylsiloxanes, and platinum on silica, alumina or carbon, though not limited thereto. Known examples of the platinum group compounds other than the platinum compound are rhodium, ruthenium, iridium and palladium compounds, for example, $RhCl(PPh_3)_3$, $RhCl(CO)(PPh_3)_2$, $Ru_3(CO)_{12}$, $IrCl(CO)(PPh_3)_2$, and $Pd(PPh_3)_4$.

The catalyst is used in a catalytic amount. Usually, the preferred amount of the catalyst is about 0.1 to 100 parts by weight of platinum group metal per million parts by weight of components (A), (B) and (E) combined.

Component (D) is finely divided silica. This filler component plays the important role of imparting thixotropy to the composition prior to curing. Since the filler component will not be extracted with solvents or contracted after curing, it does not adversely affect the properties of electronic parts when the composition is used as a protective material for the parts.

In order that finely divided silica interact with components (A) and (E) to exert thixotropic effects, the finely divided silica should have a specific surface area of at least 50 m²/g, preferably 50 to 400 m²/g and be surface hydrophobized. With the lack of either of these requirements, the desired thixotropy is not imparted. The hydrophobic treatment is to treat with polysiloxanes, especially having methyl groups. Suitable surface treating agents include cyclic and linear polydimethylsiloxanes, which may be used alone or in admixture of any. After the silica filler is surface treated to be hydrophobic, the amount of carbon on the treated silica surface is preferably 0.3 to 8% by weight, especially 2 to 6% by weight, based on the entire hydrophobized silica. The surface treated silica is desirably of high purity because the purity of the composition, which is crucial in the application to electric and electronic parts, largely depends on the purity of the silica.

Commercial products may be used as the finely divided silica of high purity, for example, Cabosil TS-720 (Cabot Corp.).

Finely divided silica is desirably included in amounts of 0.5 to 8 parts by weight, more desirably 2 to 6 parts by weight, per 100 parts by weight of components (A) and (E) combined. Less than 0.5 part of silica may fail to render the composition fully thixotropic with the risk of the uncured composition flowing away upon spot potting. More than 8 parts of silica may increase a viscosity and adversely affect workability. Most preferably, finely divided silica is included in such amounts for the composition to have a thixotropy index of 1.5 to 3.5, especially 2.0 to 3.2. It is noted that the thixotropy index is a ratio of the apparent viscosity at a low rotation speed (e.g., 4 to 12 rpm) to the apparent viscosity at a high rotation speed (e.g., 20 to 60 rpm), provided that a ratio of the high rotation speed to the low rotation speed is at least 5, preferably in the range from 5 to 10.

Component (E) is a second linear polyfluoro compound of the following general formula (2):

wherein X and "a" are as defined above, and $Rf^2$ is a monovalent perfluoropolyether group.

Like component (A), the alkenyl groups in formula (2) are preferably vinyl and allyl groups having a —CH=CH₂ structure at the end. The alkenyl groups may be bonded to the backbone directly or via divalent linkage groups represented by X.

In formula (2), $Rf^2$ is a monovalent perfluoropolyether group, and preferably selected from groups of the following formulae:

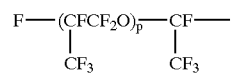

wherein p is an integer of at least 1, and

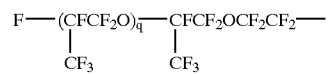

wherein q is an integer of at least 1.

Illustrative examples of $Rf^2$ are given below.

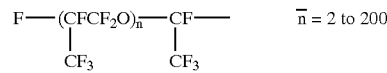

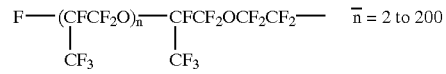

In formula (2), X and "a" are as defined in formula (1). X and "a" in formula (1) may be identical with or different from X and "a" in formula (2).

Component (E) is preferably included in amounts of 0 to 200 parts by weight, more preferably 50 to 180 parts, and most preferably 80 to 150 parts by weight, per 100 parts by weight of component (A). Inclusion of component (E) facilitates adjustment of physical properties of the cured composition, inter alia, penetration and has the additional advantage that the cured composition becomes thermally stable. To enhance such effects, component (E), when used, is preferably included in amounts of at least 80 parts by weight.

In addition to components (A) to (E), the inventive composition may contain various additives known to those skilled in the art. Such optional additives include regulators for hydrosilylation catalysts, for example, acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenylbutynol, 3-methyl-3-penten-1-yne, 3,5- dimethyl-3-hexen-1-yne, etc., polymethylvinylsiloxane cyclic compounds, and organic phosphorus compounds. These regulators are effective for maintaining curing reactivity and storage stability appropriate. Other optional components include inorganic fillers, for example, iron oxide, zinc oxide, titanium oxide, calcium carbonate, magnesium carbonate, zinc carbonate, and carbon black. By adding such inorganic fillers to the inventive composition, the hardness and mechanical strength of cured gel can be adjusted. There may be added hollow inorganic fillers and rubbery spherical fillers as well. Also, by adding a well compatible perfluoropolyether oil free of reactive functional groups, the viscosity of the composition or the hardness of a cured product can be adjusted. The amounts of these optional components added are arbitrary insofar as they do not compromise the properties of the curable composition and the physical properties of cured gel.

The fluorinated curable composition comprising the essential and optional components mentioned above is cured into a gel product (or cured gel) having improved solvent resistance and chemical resistance.

By the term "cured gel" as used herein it is meant that the cured product has a three-dimensional structure in part and undergoes deformation and flow under stress. As an approximate measure, the cured gel has a hardness of up to "0" as measured by a JIS rubber hardness meter or a penetration of 1 to 200 as measured according to ASTM D-1403 (¼ cone).

The cured gel is generally obtained by well-known methods, for example, by pouring the inventive composition of the addition curing type into a suitable mold and causing the composition to cure therein. Alternatively, the inventive composition is coated onto a suitable substrate and cured thereon. Curing is effected simply by heating at a temperature of about 60 to 150° C. for about 30 to 180 minutes.

Electrical and electronic parts can be sealed with the cured composition and include various sensors, for example, pressure sensors (e.g., gas pressure sensors and hydraulic pressure sensors), temperature sensors, rotation sensors, and timing sensors as well as air flow meters and various control units.

There have been described fluorinated curable compositions in which components (A) and (E), alkenyl group-bearing perfluoropolyethers are used as the base polymer of a gel composition to ensure chemical resistance and solvent resistance and component (D), hydrophobized silica fine powder is used in combination therewith to render the gel composition thixotropic.

EXAMPLE

Examples of the invention are given below by way of illustration and not by way of limitation. Parts are by weight.

Example 1

To 40 parts of a polymer (viscosity 2,100 cSt) of the following formula (3) and 60 parts of a polymer (viscosity 650 cSt) of the following formula (4) was added 3.0 parts of Cabosil TS-720 (Cabot), which is polysiloxane-treated silica having a specific surface area of 100 m²/g and a carbon content on hydrophobic surface of 4.5% by weight calculated as carbon, as the finely divided silica. They were mixed in a planetary mixer until uniform, and further heat treated at 150° C. for 2 hours. The mixture was cooled down to room temperature, after which were added 0.15 part of a 50% toluene solution of ethynylcyclohexanol, 0.015 part of an ethanol solution of a chloroplatinic acid-vinylsiloxane complex (platinum concentration 3.0% by weight), and 14 parts of a compound of the following formula (5). Mixing these components yielded a fluorinated composition.

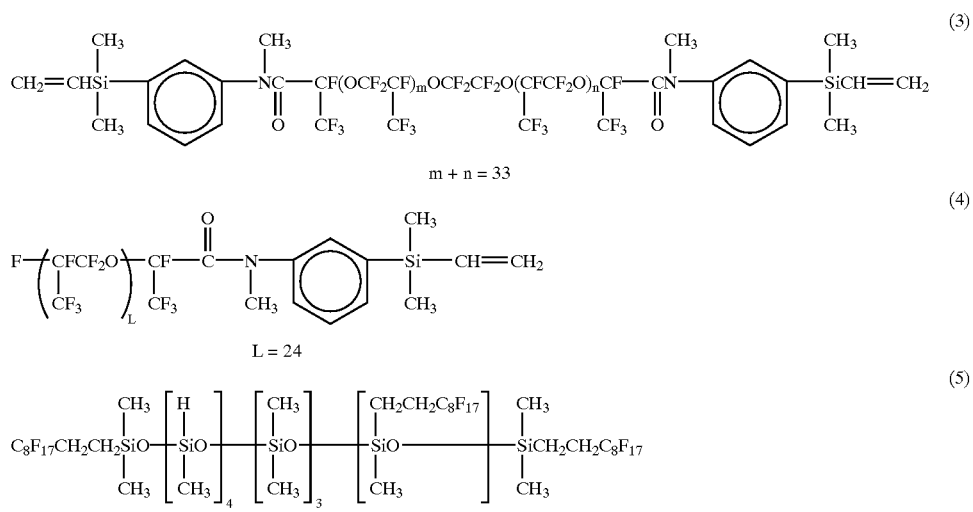

Using a rotational viscometer, the viscosity of the composition was measured at a rotational speed of 6 rpm and 30 rpm, and a thixotropy index was computed from these viscosities. The composition was cured by heating at 150° C. for one hour, obtaining a cured gel whose penetration was measured according to ASTM D-1403 (¼ cone). The results are shown in Table 1.

Example 2

A composition was prepared as in Example 1 except that the amount of finely divided silica was changed to 4.0 parts. The viscosity and thixotropy index of the composition and the penetration of the gel were measured as in Example 1, with the results also shown in Table 1.

Comparative Example 1

A composition was prepared as in Example 1 except that the amount of finely divided silica was changed to 0.3 part. The viscosity and thixotropy index of the composition and the penetration of the gel were measured as in Example 1, with the results also shown in Table 1.

Comparative Example 2

A composition was prepared as in Example 1 except that the finely divided silica used in Example 1 was changed to 3.0 parts of Aerosil R974 (Nippon Aerosil Co., Ltd.), which is dimethyldichlorosilane-treated silica having a specific surface area of 170 m$^2$/g and a carbon content on hydrophobic surface of 1% by weight calculated as carbon. The viscosity and thixotropy index of the composition and the penetration of the gel were measured as in Example 1, with the results also shown in Table 1.

TABLE 1

|  | Example | | Comparative Example | |
|---|---|---|---|---|
|  | 1 | 2 | 1 | 2 |
| Viscosity @ 6 rpm (Pa · s) | 22.7 | 40.5 | 10.3 | 12.7 |
| Viscosity @ 30 rpm (Pa · s) | 9.0 | 13.1 | 7.5 | 9.1 |
| Thixotropy index | 2.5 | 3.1 | 1.4 | 1.4 |
| Penetration | 58 | 44 | 61 | 54 |

A quantity (3 g) of each composition of Examples 1, 2 and Comparative Examples 1, 2 was spilled on a glass plate. The compositions of Examples 1 and 2 retained their shape whereas the compositions of Comparative Examples 1 and 2 spread out without retaining shape.

Japanese Patent Application No. 2001-389406 is incorporated herein by reference.

Reasonable modifications and variations are possible from the foregoing disclosure without departing from either the spirit or scope of the present invention as defined by the claims.

What is claimed is:

1. A thixotropic fluorinated curable composition comprising (A) a linear polyfluoro compound of the general formula (1):

$$CH_2=CH—(X)_a—Rf^1—(X')a —CH=CH_2 \quad (1)$$

wherein X is —CH$_2$, —CH$_2$O—, —CH$_2$OCH$_2$— or —Y—NR$^1$—CO—, Y is —CH$_2$— or a group of the following structural formula (Z):

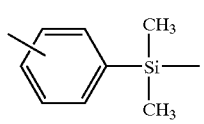

(Z)

wherein X' is —CH$_2$, —OCH$_2$—, —CH$_2$OCH$_2$— or —CO—NR$^1$—Y'—, Y' is —CH$_2$— or a group of the following structural formula (Z'):

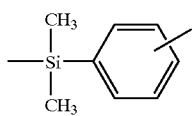

(Z')

R$^1$ is hydrogen, methyl, phenyl or allyl, Rf$^1$ is a divalent perfluoropolyether group, and "a" is independently 0 or 1, (B) an organohydrogensiloxane having at least two hydrogen atoms each attached to a silicon atom in a molecule, (C) an effective amount of a platinum group metal catalyst, (D) finely divided silica hydrophobized with a polysiloxane and having a specific surface area of at least 50 m$^2$/g, and (E) a second linear polyfluro compound of the following general formula (2):

(2)

wherein X and "a" are as defined above, and Rf$^2$ is a monovalent perfluoropolyether group.

2. The curable composition of claim 1, wherein Rf$^1$ in formula (1) is

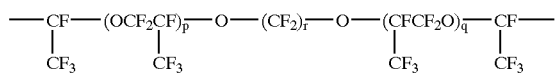

wherein p and q each are an integer of at least 1, the sum of p+q is 2 to 200, and r is an integer of 2 to 6,

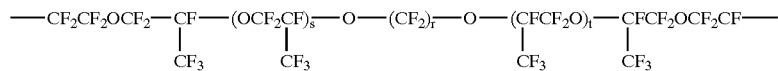

wherein r is an integer of 2 to 6, s is an integer of at least 0, t is an integer of at least 0, and the sum of s+t is 0 to 200, or

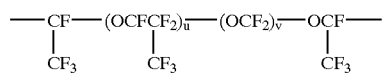

wherein u is an integer of 1 to 200 and v is an integer of 1 to 50.

3. The curable composition of claim 1, wherein Rf$^2$ in formula (2) is

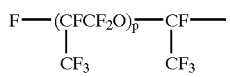

wherein p is an integer of at least 1, or

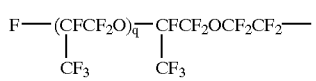

wherein q is an integer of at least 1.

4. The curable composition of claim 1, wherein the finely divided silica (D) is included in an amount of 0.5 to 8 parts by weight per 100 parts by weight of component (A) or components (A) and (E) combined.

5. The curable composition of claim 1, having a thixotropy index of 1.5 to 3.5.

6. The curable composition of claim 1, which cures into a product having a penetration of 1 to 200 as measured according to ASTM D-1403.

7. An electric or electronic part sealed with the thixotropic fluorinated curable composition of claim 1 in the cured state.

8. A pressure sensor sealed with the thixotropic fluorinated curable composition of claim 1 in the cured state.

9. A rotation sensor sealed with the thixotropic fluorinated curable composition of claim 1 in the cured state.

10. An air flow meter sealed with the thixotropic fluorinated curable composition of claim 1 in the cured state.

* * * * *